April 27, 1965   H. L. BUFFINGTON   3,180,529
PORTABLE REFRIGERATED BAR
Filed Jan. 26, 1962   5 Sheets-Sheet 1

Herman L. Buffington
INVENTOR.

BY *Clarence A. O'Brien*
and *Harvey B. Jacobson*
Attorneys

April 27, 1965   H. L. BUFFINGTON   3,180,529
PORTABLE REFRIGERATED BAR
Filed Jan. 26, 1962   5 Sheets-Sheet 2
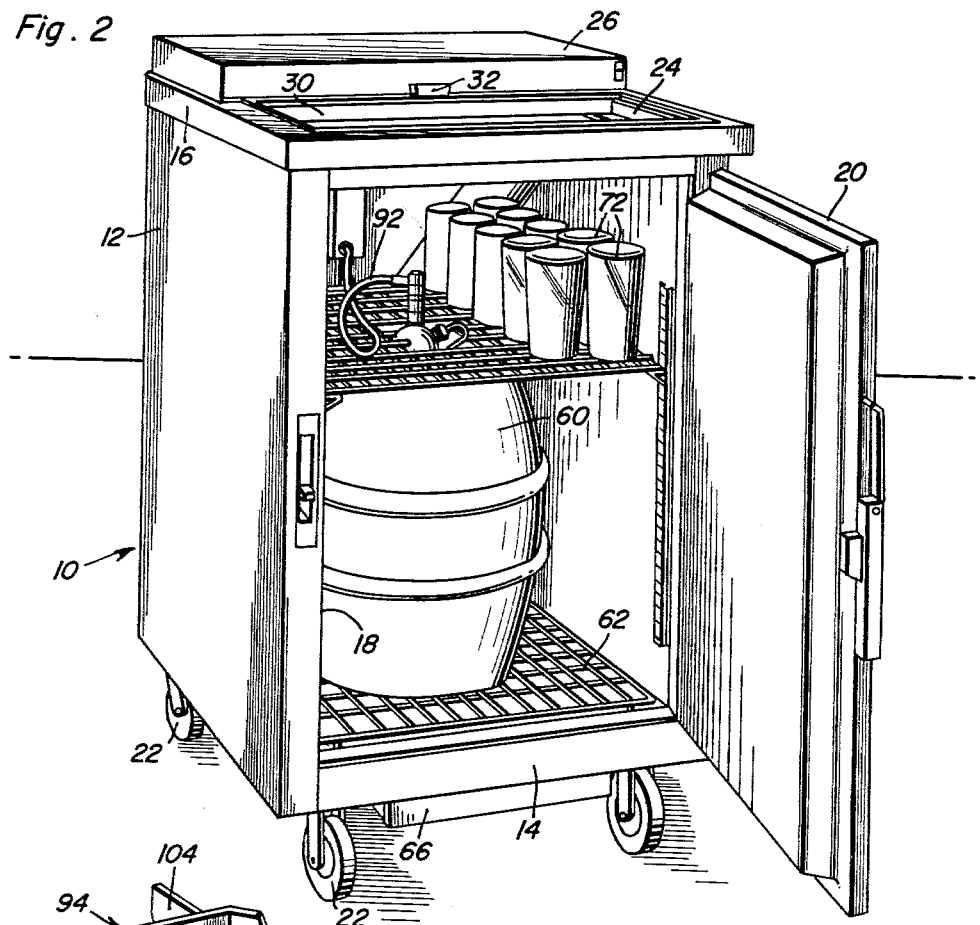
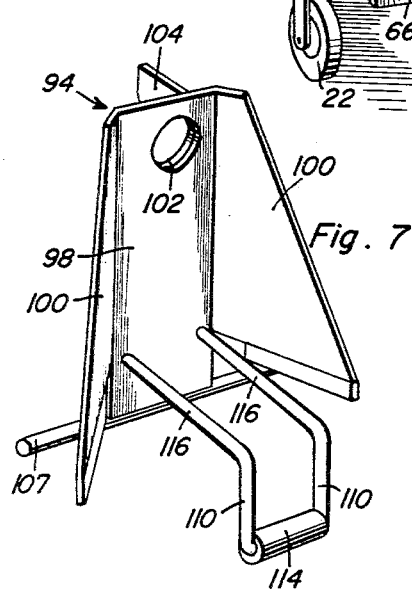
Herman L. Buffington
INVENTOR.

April 27, 1965

H. L. BUFFINGTON 3,180,529

PORTABLE REFRIGERATED BAR

Filed Jan. 26, 1962

Herman L. Buffington
INVENTOR.

BY *Clarence A. O'Brien*
*and Harvey B. Jacobson*
Attorneys

April 27, 1965     H. L. BUFFINGTON     3,180,529
PORTABLE REFRIGERATED BAR

Filed Jan. 26, 1962     5 Sheets-Sheet 4

Herman L. Buffington
INVENTOR.

BY *Clarence A. O'Brien*
*and Harvey B. Jacobson*
Attorneys

April 27, 1965   H. L. BUFFINGTON   3,180,529
PORTABLE REFRIGERATED BAR
Filed Jan. 26, 1962   5 Sheets-Sheet 5
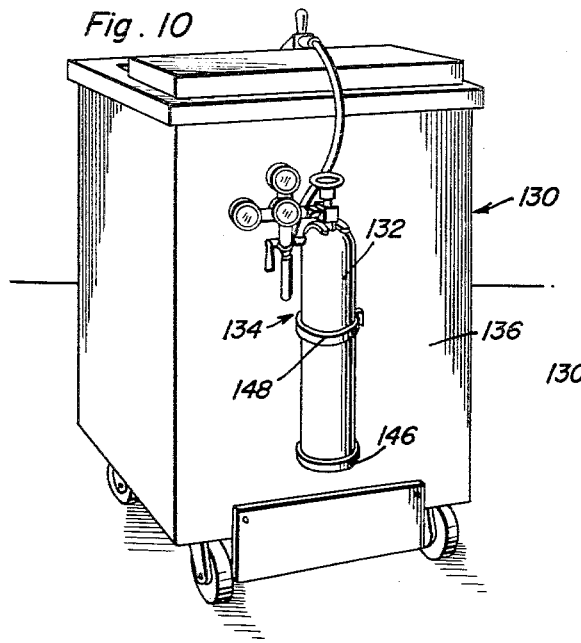
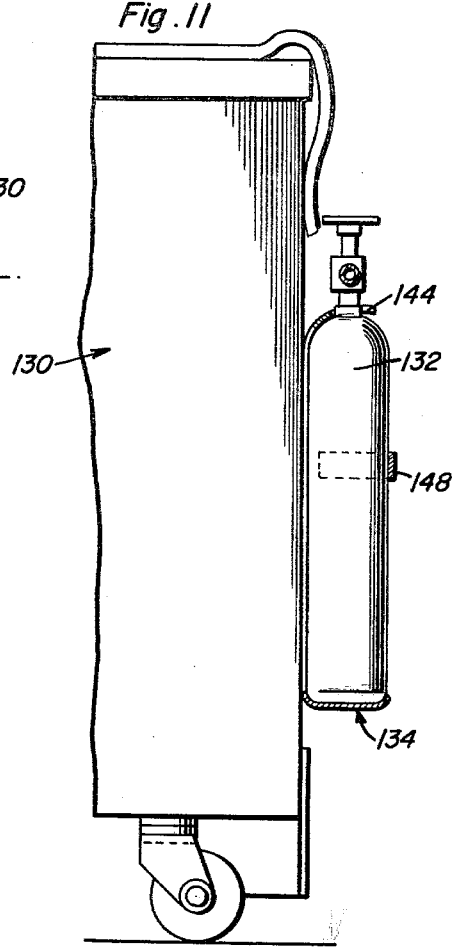
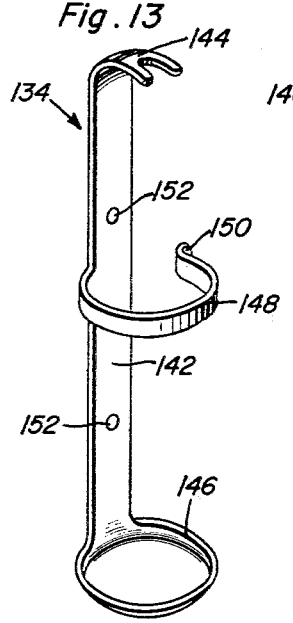
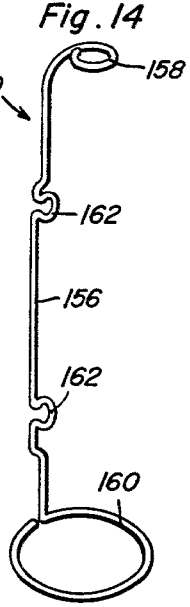
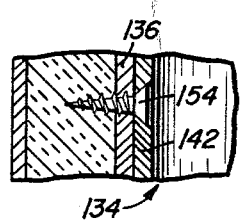
Herman L. Buffington
INVENTOR.

United States Patent Office 3,180,529
Patented Apr. 27, 1965

3,180,529
PORTABLE REFRIGERATED BAR
Herman L. Buffington, P.O. Box 1981,
Spartanburg, S.C.
Filed Jan. 26, 1962, Ser. No. 169,018
18 Claims. (Cl. 222—131)

This invention comprises a novel and useful portable refrigerated bar and more particularly pertains to a mobile refrigerated cooling cabinet to efficaciously store and maintain in a chilled or refrigerated condition various types of beverage containers, beverage glasses and the like.

The primary purpose of this invention is to provide a compactly constructed portable refrigerated cabinet which may be readily moved about an area as desired and which shall maintain pressurized kegs and other containers of beverage in a chilled condition ready for dispensing as desired.

A very important object of the invention is to provide a device which will store and chill in a fully mobile cabinet a variety of sizes of kegs or other containers of beverages in a convenient but concealed manner together with all the equipment necessary for chilling, pressurizing and dispensing such beverages.

A further object of the invention in accordance with the preceding object is to provide a convenient access means into the interior of the cabinet in both the top and the front thereof for the purpose of servicing, connecting or disconnecting a keg or other container or a source of pressurizing gas therefor and for other purposes.

A still further object of the invention is to provide a device in accordance with the preceding objects providing a tap or faucet for dispensing beverages from the pressurized containers together with a mounting means therefor by which the faucet and its mounting bracket may be folded into the cabinet and maintained in a chilled condition when not in use and may be quickly and easily moved into an external operative position when needed.

Still another object of the invention is to provide a device in accordance with the foregoing objects which shall provide an adjustable shelf arrangement for conveniently storing glasses and other related accessories within the cabinet for maintaining them readily available when required and in a chilled condition conducive to more enjoyable and satisfactory use of the same.

Yet another object of the invention is to provide a refrigerated mobile bar for dispensing chilled beverages and wherein a beverage container is disposed within the interior of a refrigerated cabinet together with the mounting of a pressurizing device in a conveniently replaceable and accessible manner upon the cabinet exterior.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a perspective view of the arrangement of FIGURE 1 but showing the top and front access openings open to disclose the interior of the cabinet and the manner in which access is obtained to the interior thereof, the dispensing faucet being however in its recessed inoperative position inside the cabinet;

Figure 1:
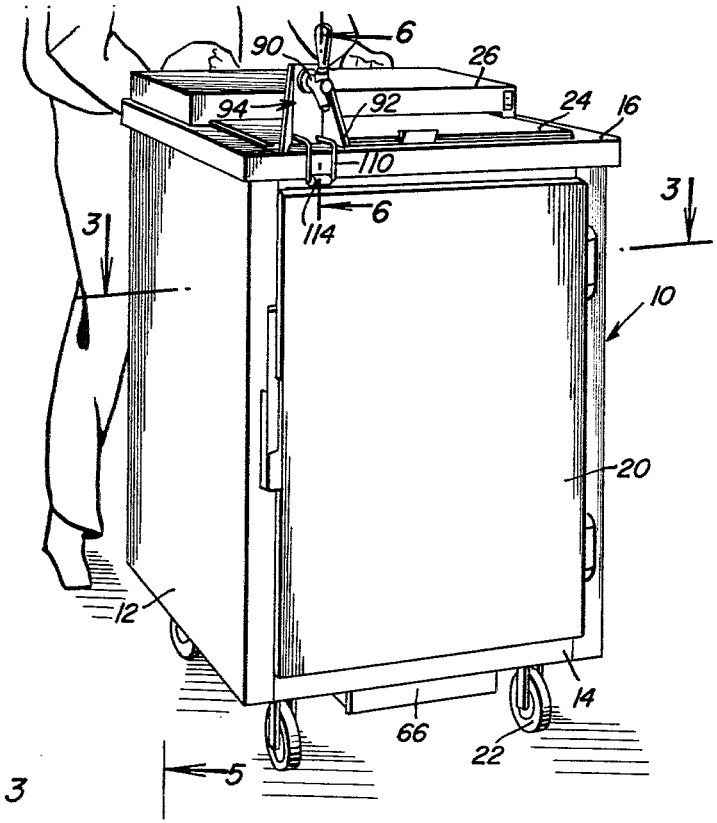
FIGURE 1 is a perspective view of the mobile bar in accordance with this invention in a position and condition ready for the dispensing of pressurized beverages.
Figure 3:
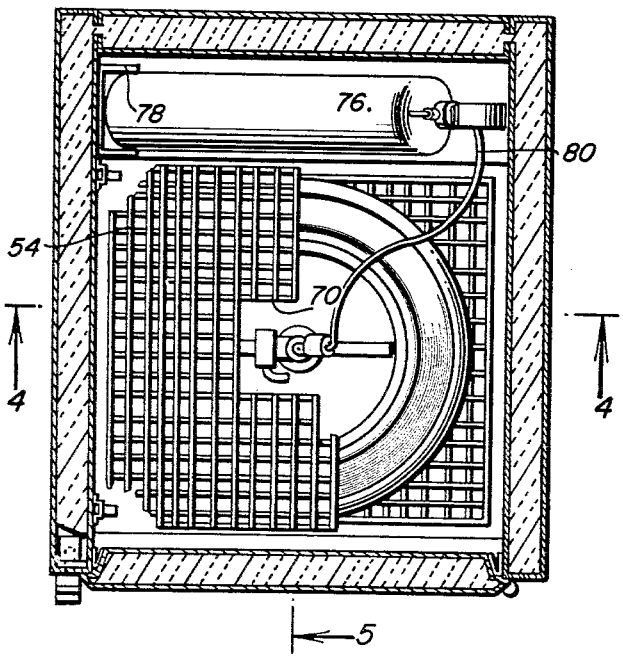
Figure 4:
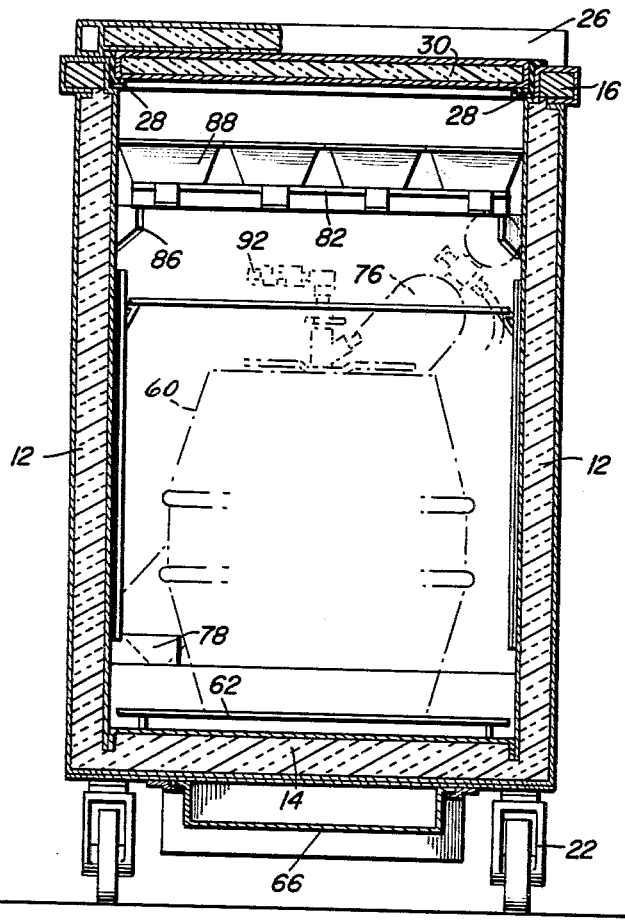
Figure 8:
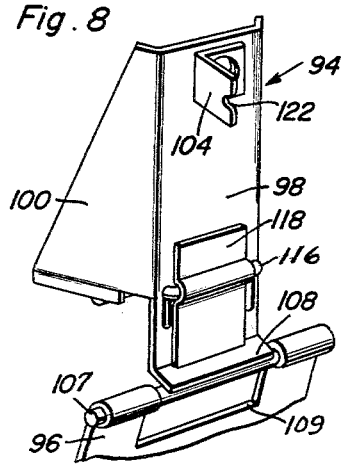
Figure 9:
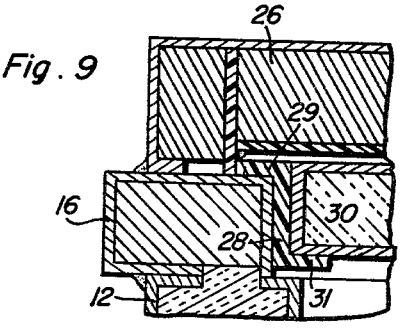
Figure 5:
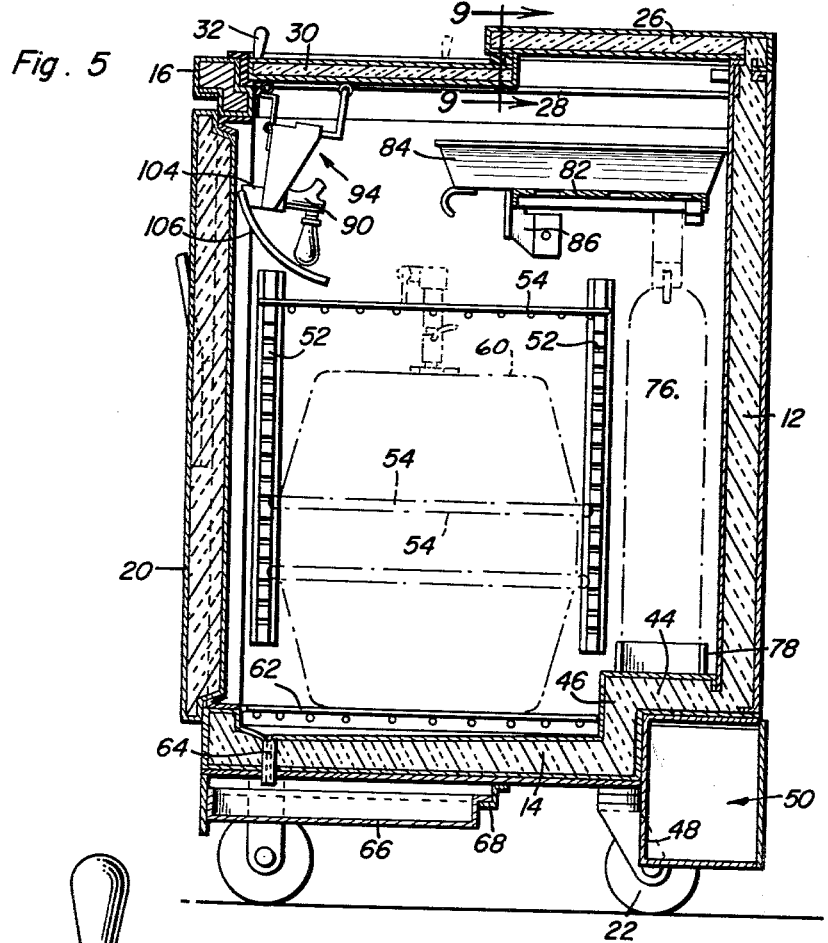
Figure 6:
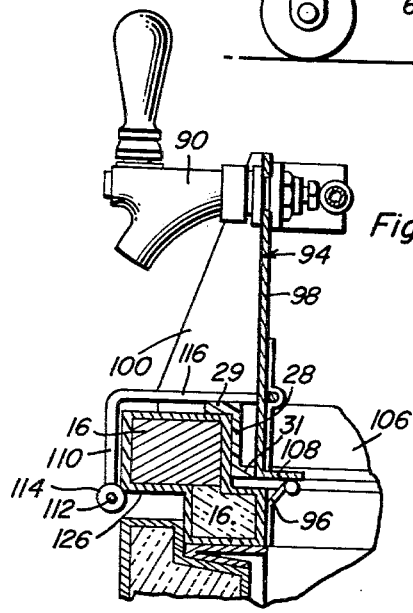

FIGURE 3 is a horizontal sectional view part of a shelf being broken away and being taken substantially upon the plane indicated by the section line 3—3 of FIGURE 1 and showing certain details of the arrangement and internal construction of the device and particularly the manner in which the source of pressurizing gas is conveniently housed within the cabinet during its operative connection with the beverage keg therein;

FIGURE 4 is a view in vertical transverse section taken substantially upon the plane indicated by the section line 4—4 of FIGURE 3, the position of certain elements therein being shown in dotted lines and a portion of the top wall being broken away and shown in section;

FIGURE 5 is a vertical transverse sectional view taken substantially upon the plane indicated by the section line 5—5 of FIGURE 3 and being taken at right angles to that of FIGURE 4 and showing further details of the interior of the cabinet with the latter in a fully closed position and with the faucet being shown in its folded stored position therein, a beverage keg and pressurizing cylinder being shown in dotted lines therein;

FIGURE 6 is a detail view taken upon an enlarged scale in vertical transverse section substantially upon a plane indicated by the section line 6—6 of FIGURE 1 and showing further details of the foldable mounting means of the dispensing faucet of the device;

FIGURE 7 is a perspective view of the mounting bracket of the faucet;

FIGURE 8 is a perspective view from the other side of the mounting bracket of FIGURE 7 a part of the bracket mounting base being broken away;

FIGURE 9 is a detail view taken upon an enlarged scale in vertical transverse section substantially upon the plane indicated by the section line 9—9 of FIGURE 5 and showing certain features of the sliding top door of the cabinet;

FIGURE 10 is a perspective view from the rear of a slightly modified form of mobile bar having the pressurizing tank mounted upon the exterior of the cabinet;

FIGURE 11 is a fragmentary side elevational view upon an enlarged scale of a portion of the apparatus of FIGURE 10;

FIGURE 12 is a detail view of a fastening means for attaching the mounting bracket of FIGURE 10; and FIGURES 13 and 14 are perspective views of two alternative forms of brackets which may be used with the apparatus of FIGURE 10.

In the accompanying drawings the numeral 10 designates generally an insulated cabinet of any suitable material and construction in accordance with the purpose of this invention and which comprises vertically extending side, back and front walls each indicated by the numeral 12 together with a bottom wall 14 and a top 16. One of the vertical walls which may be considered as the front wall is provided with an opening 18 which is adapted to receive a hinged door 20 as a closure therefor. In this manner access can be had to the interior of the cabinet from one side thereof and throughout substantially the entire vertical extent of the interior of the cabinet. Since the details of construction, mounting and locking of the door 20 form no part of the invention claimed herein, a further description of the same is deemed to be unnecessary.

The cabinet is rendered mobile by the provision of a plurality of supporting wheels 22 depending therebeneath, one or more of which supporting wheels may comprise caster rollers or wheels and which thus render the cabinet easily movable from place-to-place as suggested in FIGURE 1.

The top 16 of the cabinet has an opening 24 therethrough and a top wall or panel 26 is secured over this opening at the rearward portion thereof from the door. Mounted within the top structure for horizontal sliding movement as upon the sliding rails 28, see FIGURE 4, is a top closure 30 in the form of a panel which is slidable as by means of an upwardly projecting handle 32 from a forward position shown in FIGURE 5 in which the opening 24 is completely closed to a rearward position suggested in FIGURE 2 in which the closure panel 30 is slid under the fixed top wall member 26 and thus uncovers the access opening 24 at the forward portion of the latter adjacent the door 20.

By means of the top closure 30 access may be had when desired to the interior of the cabinet for various purposes as set forth hereinafter.

The structural details of the top structure of the cabinet including the sliding closure 30 are shown somewhat more clearly in FIGURE 9. As will be observed, the fixed closure member 26 rests upon the top surface of the top wall 16 and overlies the rearward portion of the opening 24 therein, and has its lower end in spaced relation to the slidable closure member 30. The rails 28 are associated with the opening 24 in the top 16 and overhang the top surface of the latter by means of upper outturned flanges while lower inturned flanges underlie and support the bottom surface of the slidable closure 30.

It will thus be observed that the top closure 30 may be readily removed from the top wall when necessary by merely lifting it from the rails 28, but when received in place will enable the panel or closure 30 to be horizontally slidable with respect to the front portion of the opening as previously set forth. The rails 28 are Z-shaped in cross-section, having an upper horizontal outturned flange 29 and a lower horizontal inturned flange 31 upon which the closure 30 slides.

Referring now especially to FIGURE 5 it will be observed that the bottom wall 14 adjacent the back vertical wall 12 which is opposite the door 20 is provided with an upwardly stepped shelf or ledge as at 44 having at its forward end a vertical wall portion 46. Secured to the cabinet beneath this ledge is a housing as at 48 which serves as a chamber to removably receive therein as indicated generally by the numeral 50 any conventional form of a motor-operated refrigerating unit. Inasmuch as refrigerating units for this purpose are well known, and since the principles of the invention as claimed herein are not limited to any particular construction or operation thereof, further details as to the construction and operation of such a unit and its association with the refrigerating system of the cabinet are deemed to be unnecessary and have been omitted therefrom.

It will be understood that all of the wall portions of the cabinet are provided with the necessary thermal insulation and that suitable refrigerating coils, not shown are provided to properly chill the interior of the cabinet.

Upon a pair of opposite side walls there are provided suitable adjustable racks each indicated by the numeral 52 for the purpose of supporting at adjustable elevations thereon horizontally extending trays or shelves as at 54. Inasmuch as the details of the structures of the racks, the shelves or trays and their adjustable supports form no part of the invention claimed herein a further description of the same is deemed to be unnecessary.

The main portion of the interior of the cabinet serves as a repository or storage space for receiving therein a beverage container such as a keg or barrel 60. A grating or grill 62, suitably supported above the floor of the interior of the cabinet as suggested in FIGURES 4 and 5, serves to support the beverage container and provide a space therebeneath for the collection of condensation and the like. This condensation may be removed as by a drain indicated at 64 in FIGURE 5 into a drip pan or tray as at 66 carried by supporting tracks 68 so that the condensation collecting can be readily removed when necessary.

The topmost shelf or tray 54, as shown in FIGURES 2 and 3, is provided with a central opening 70 therethrough to provide the necessary connections to the beverage container 60 for the purpose of applying pressure thereto and for dispensing beverage therefrom. The other shelves or trays 54 may be selectively positioned in the cabinet upon the supporting racks 52 when the beverage container 60 is omitted from the cabinet as suggested in dotted lines in FIGURE 5 and will then serve to support in convenient positions bottled drinks and cans of various types to be retained in a chilled refrigerated condition in readiness for use when necessary, as well as supporting other accessories such as glasses, or other drinking vessels as suggested by the numeral 72 in FIGURE 2.

In addition to the supporting of a beverage container 60 of various standard sizes in the cabinet provision is made for also supporting a pressurizing means 76 in the position shown in full lines in FIGURE 3 and in dotted lines in FIGURES 4 and 5. The pressurizing means may conveniently comprise a conventional bottle of carbon dioxide or other pressurizing agent and it is preferably supported upon the shelf 44 as by being received in retaining members 78 as shown in FIGURES 3 and 5. A flexible conduit means such as a hose 80 is detachably connected to the pressurizing tank 76 and to the conventional connection afforded by the beverage container 60 as shown in FIGURE 3 so that the pressure of the gas is applied to the interior of the beverage container to assist in dispensing the contents of the latter.

Mounted upon opposite side walls in the interior of the cabinet is a grill or shelf as at 82 adapted to receive a pan or tray 84 for any suitable purpose thereon. This shelf is supported as by mounting brackets 86, see FIGURES 4 and 5, so that ice-making trays or the like as at 88 may be supported thereby.

A very important feature of this invention resides in the convenient mounting of the beverage dispensing tap or faucet 90 which latter is connected as by a flexible conduit 92, shown in FIGURES 1, 2 and 4 to the pressurized beverage container 60. The faucet 90 is hingedly mounted so that it may be selectively folded with its mounting means downwardly through the opening 24 in the top of the cabinet into a recessed position in the cabinet when not in use, whereupon the sliding closure 30 may be operated to completely close the top of the cabinet, or into an upwardly extended position on the exterior of the cabinet in readiness for dispensing beverage from the container. The purpose of this arrangement is not only to render the cabinet more compact and free of any external projections therefrom when the cabinet is not in use, but also to retain the faucet in a chilled refrigerated condition so that it is immediately available for dispensing chilled beverage as soon as the top closure is opened and the faucet moved upwardly into operating position.

Referring now more specifically to the showings in FIGURES 1, 5-8, it will be seen that the faucet is supported by a mounting bracket indicated generally by the numeral 94. The mounting bracket 94 in turn is hingedly connected to a base 96 which latter is secured, as shown best in FIGURE 6, to the top 16 of the cabinet upon the interior surface thereof and adjacent that edge of the opening 24 which lies proximate the door 20. The bracket 94 consists of a flat centrally disposed web 98 having a pair of laterally and outwardly divergent wings 100 projecting therefrom. An aperture 102 is provided in the web 98 and the neck of the faucet 90 is fixedly secured therethrough in a conventional manner as shown in FIGURE 6, so that the faucet is supported thereby and has its dispensing nozzle projecting between the wings 100.

Upon what may be termed the rear face of the central web 98 there is provided as shown in FIGURE 8 a rearwardly extending bracket member 104 which in the folded position of the faucet and its mounting bracket is adapted to engage against a stop bracket 106 as shown in FIGURE 5 thus limiting the inward swinging movement of the faucet and its mounting bracket.

At its lower end, the central web 98 has a transversely extending pivot pin 107 by which it is hingedly secured to the base 96. As will be noted from a comparison of FIGURES 6 and 8, the lower end of the web 98 is provided with a laterally and rearwardly disposed flange as at 108 and the base 96 is provided with a cutaway notch or portion 109 to permit passage of this flange therethrough during the folding operation.

As so far described it will now be apparent that the mounting bracket 94 and the faucet 90 carried thereby can be swung from a downwardly disposed position shown in FIGURE 5 and within the cabinet structure in which position the closure 30 may be slid across the opening to completely close the top of the cabinet, to an upward or erected position shown in FIGURE 6 with the bracket and the faucet being disposed above the cabinet top wall and at the front edge thereof in a position for convenient dispensing of beverage from the container 60 into glasses or other drinking vessels.

In order to more securely position and retain the faucet and its mounting means in its operative position, there is provided a resilient locking clamp. This locking clamp consists of a resilient wire-like member consisting of a pair of arms 110 having an integral bight portion 112 therebetween upon which is rotatably journalled a sleeve or roller 114. The arms 110 have angulated portions 116 which disposed on what may be termed the forward face of the bracket 98 extend through apertures therein and have inturned ends which are clamped beneath a clamping plate 118 secured to the back surface of the plate 98 as shown in FIGURE 8.

The arrangement is such that as the mounting bracket is swung upwardly about its pivot pin 107, the resiliency of the arms will cause the sleeve 112 to ride across the top surface of the top 16 and snap over the latter and into a space or recess 120 disposed therebeneath as shown in FIGURE 6 to thus resiliently hold the bracket and faucet in their elevated position. The device is readily released by merely disengaging the sleeve 114 by flexing the arms 110 whereupon the device may be folded downward into the stored position of FIGURE 5 with the bracket 104 sliding upon the flexible member 106 until the notch 122 in the member 104 is engaged over the upper end of the member 106.

With this arrangement it will be observed that the wings 100 serve not only to stiffen and reinforce the plate-like member 98 of the mounting bracket but also serve as a splash shield or guard assisting in positioning a drinking vessel beneath the spout and in preventing splashing of the liquid from the vessel.

In the embodiment of FIGURES 1–9, the pressurizing tank 76 is described and illustrated as being housed and supported within the refrigerated cabinet. In some instances, however, it will be preferred to position the pressure container upon the exterior of the mobile bar in order to facilitate its replacement when necessary, to avoid the subjecting of the pressurizing container to the refrigerated temperature within the cabinet or to render the space which it would require within the cabinet available for other purposes. FIGURES 10–14 illustrate an arrangement for this purpose.

Shown at 130 is a refrigerated mobile bar having a pressurizing tank or container 132 mounted upon its exterior as by a supporting or mounting bracket 134 carried upon an exterior wall such as the back wall 136. While the mounting bracket may be of various types, and the invention disclosed and claimed herein is not limited to any particular construction of bracket, two suitable bracket forms are shown at 134 and 140 in FIGURES 13 and 14. Except for the external support brackets 134 and 140, this form of the invention is of the same construction as that specifically described and illustrated in FIGURES 1–9.

The bracket 134 conveniently comprises a unitary or one-piece stamping of sheet metal or other suitable material including a flat vertical bar 142 provided with generally parallel upper and lower lateral projections 144 and 146. The former is preferably bifurcated to grip the top of the tank 132 with the bifurcated portion embracing the neck of the valve fitting as shown in FIGURES 10 and 11. The lower portion 146 comprises a seat to support thereon the lower end of the tank 132 and preferably comprises a ring. Intermediate its ends the bar 142 has a laterally projecting arcuate retaining arm or clip 148 having a turned back extremity 150. This arm has inherent resiliency for yieldingly embracing and retaining therein the tank 132 which thus can be readily inserted into or removed from the resilient clip through the open end 150 thereof in an obvious manner. Apertures 152 in the bar 142 receive fasteners 154, see FIGURE 12, which may comprise self-tapping metal screws by which the bracket is fastened to the cabinet side.

An alternative form of bracket is shown at 140 in FIGURE 14 which comprises a one-piece wire construction including a vertical bar 156 having outturned, integral ring-like top and bottom portions 158 and 160. The members 158 and 160 engage and resiliently embrace therebetween the top and bottom ends of the tank 132 and each or both of the end portions of the bar 156 may be resiliently biased for this purpose. Intermediate its ends, the bar 156 is shaped to form C-shaped eyelets 162 for receiving the fasteners 154 by which the bracket is detachably secured to the cabinet. The operation of this form of bracket is likewise believed to be clearly apparent.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A mobile refrigerated bar comprising a cabinet having bottom and top walls together with vertical walls each having unbroken lower and upper edges connected to said bottom and top walls respectively, a door forming an entrance in one of said vertical walls, said top wall having an opening extending adjacent to one of said vertical walls, a horizontally slidable closure controlling said top opening, means carried by said cabinet for refrigerating the interior thereof, beverage supply means in said cabinet, a faucet having a conduit connected to said supply means, means movably mounting said faucet upon said cabinet for movement between an extended dispensing position above said top wall and through said top opening and a retracted position disposed within said cabinet and below said top wall.

2. The combination of claim 1 including pressurizing means supported by said cabinet and connected to said supply means and causing flow of beverage from the latter to said faucet.

3. The combination of claim 2 including support means in said cabinet comprising an elevated portion of said bottom wall removably receiving said pressurizing means.

4. The combination of claim 1 wherein said cabinet includes supporting wheels secured thereto and disposed therebeneath, said top wall including a stationary portion having a horizontal planar top surface, said closure having a horizontal planar surface, means mounting said closure for guided rectilinear horizontal travel beneath said stationary portion when said closure uncovers said top opening.

5. A mobile refrigerated bar comprising a cabinet having enclosing bottom, top and vertical walls, a door constituting an entrance in one of said vertical walls, said top wall having an opening therein extending into close proximity to one of said vertical walls, a horizontally slidable closure mounted upon said cabinet and controlling said top openings, means carried by said cabinet for refrigerating the interior thereof, beverage supply means in said cabinet, a faucet having a supply conduit connected to said supply means, mounting means for said faucet including a base member secured to said cabinet upon the interior thereof, a bracket carrying said faucet and hinged to said base member for swinging movement about a generally horizontal axis, said faucet and bracket being movable between a lowered and retracted position within said cabinet and below said top wall and closure and a raised position extending upwardly through said top opening to the exterior of the cabinet.

6. The combination of claim 5 including a locking means carried by said bracket and engageable with an exterior portion of said cabinet to releasably retain said faucet in its raised position.

7. The combination of claim 6 wherein said locking means comprises a laterally projecting member on said bracket and having a gripping element thereon releasably engageable with said top exteriorly of said cabinet.

8. The combination of claim 5 wherein said bracket comprises an elongated plate having an opening through which said faucet extends, divergent and laterally projecting flanges upon the side edges of said plate partially embracing said faucet therebetween.

9. The combination of claim 8 wherein said locking means comprises a laterally projecting member on said bracket and having a gripping element thereon releasably engageable with said top exteriorly of said cabinet, said locking means being mounted upon said elongated plate.

10. The combination of claim 9 wherein said locking means extends through said plate and is secured thereto upon the opposite side thereof from said flanges.

11. The combination of claim 5 including retaining means disposed entirely within said cabinet and secured thereto and engaging and releasably retaining said bracket in its lowered and retracted position.

12. The combination of claim 11 wherein said retaining means includes a stop member mounted upon and projecting laterally from the bracket upon the opposite side thereof from said faucet and a resilient element mounted upon the interior of said cabinet and engageable by said stop member.

13. A mobile refrigerated bar comprising a cabinet provided with supporting wheels, vertical walls and a bottom and top, a door forming an entrance in one of said walls, said top having an opening and a movable closure for said top opening, means carried by said cabinet for refrigerating the interior thereof, a beverage supply means in said cabinet, a faucet for dispensing beverages having a supply conduit connected to said supply means, said top including a stationary portion, means supporting said closure for horizontal sliding movement between an opening closing position and an opening uncovered position in which said closure is stored beneath said stationary portion, mounting means movably supporting said faucet upon said cabinet for movement between an extended dispensing position above said cabinet top and through said top opening and a retracted position disposed within said cabinet and below said top wall.

14. The combination of claim 13 wherein said closure supporting means comprises a pair of horizontal support rails each supported by said cabinet upon the interior thereof, said closure extending between and being slidably supported upon said rails.

15. The combination of claim 14 wherein each rail includes a longitudinally extending vertical web and a longitudinal horizontal web upon the lower edge of said vertical web, said horizontal webs being directed towards each other, said closure resting upon said horizontal web and lying between the upper and lower edges of said vertical webs.

16. The combination of claim 15 including horizontal flanges projecting laterally from the upper edges of said vertical webs and oppositely from said horizontal webs, said horizontal flanges comprising means for mounting said support rails upon said cabinet.

17. The combination of claim 13 wherein said closure supporting means comprises a pair of horizontal support rails each supported by said cabinet upon the interior thereof, said closure extending between and being slidably supported upon said rails, said support rails including outwardly projecting horizontal support flanges at their upper edges seated upon said top and horizontal inwardly projecting webs upon which said closure is slidably supported.

18. The combination of claim 17 wherein said support rails include vertical webs, said closure being disposed between the vertical webs of said pair of rails and being vertically removable therefrom, said closure being entirely received between the upper and lower surfaces of said support rails.

References Cited by the Examiner
UNITED STATES PATENTS

| | | | |
|---|---|---|---|
| 1,998,000 | 4/35 | Doering | 222—153 X |
| 2,126,491 | 8/38 | McCartha | 222—534 X |
| 2,238,193 | 4/41 | Stephens | 312—237 X |
| 2,335,581 | 11/43 | Cocanour | 312—237 |
| 2,514,773 | 7/50 | Kromer | 62—306 X |
| 2,610,101 | 9/52 | Buffington et al. | 312—236 |
| 2,694,613 | 11/54 | Williams | 312—236 X |
| 2,774,229 | 12/56 | Thau et al. | 62—395 X |
| 2,792,692 | 5/57 | Bryan | 63—400 X |
| 2,903,711 | 9/59 | Kesling | 312—236 X |
| 2,917,906 | 12/59 | Woolley | 62—400 X |
| 2,998,162 | 8/61 | Varnell | 222—146 X |

RAPHAEL M. LUPO, *Primary Examiner.*

LEVERNE D. GEIGER, LOUIS J. DEMBO, *Examiners.*